United States Patent [19]
Kawasaki

[11] 3,747,189
[45] July 24, 1973

[54] SHIPYARD

[75] Inventor: Masahiro Kawasaki, Nagasaki, Japan

[73] Assignee: Mitsubishi Jukogyo Kabushiki Kaisha, Tokyo, Japan

[22] Filed: Jan. 18, 1971

[21] Appl. No.: 107,262

[30] Foreign Application Priority Data
Jan. 23, 1970  Japan................................. 45/6125

[52] U.S. Cl. ............ 29/200 A, 114/65 R, 214/16 B
[51] Int. Cl. ............................................ B23p 19/00
[58] Field of Search................. 114/65 R, 65 A, 77;
214/1 R; 29/200 A, 430

[56] References Cited
UNITED STATES PATENTS

| | | | |
|---|---|---|---|
| 2,277,710 | 3/1942 | Mertzanoff et al. ............. | 104/48 X |
| 3,254,376 | 6/1966 | Burnett ........................ | 214/16 B X |
| 2,691,448 | 10/1954 | Lontz......................... | 214/16.1 A X |
| 2,245,486 | 6/1941 | Little............................ | 114/65 R X |
| 2,379,259 | 6/1945 | Smith........................... | 114/65 R X |
| 3,363,597 | 1/1968 | Zeien ............................... | 114/65 R |
| 3,478,525 | 11/1969 | Van Der Hoeven.......... | 114/65 R X |
| 3,487,807 | 1/1970 | Van Der Hoeven.......... | 114/65 R X |

*Primary Examiner*—Gerald M. Forlenza
*Assistant Examiner*—Frank E. Werner
*Attorney*—George B. Oujevolk

[57] ABSTRACT

A shipyard for constructing a work unit or units to be completed by a combination of a plurality of process steps, comprising a strip of conveying section which is equipped with conveying equipment, and specialized shop sections for performing the individual process steps having sufficiently wide entrances on the sides facing said strip of conveying section through which the conveying equipment and/or a work unit or units can enter or leave the individual shop sections, said specialized shop sections being so located as to surround said conveying section.

1 Claim, 2 Drawing Figures

PATENTED JUL 24 1973 3,747,189

Masahiro Kawasaki
INVENTOR.

BY George B. Cryevik
Attorney

SHIPYARD

BACKGROUND OF THE INVENTION

This invention relates to a novel layout of a shipyard for the construction of hulls.

In recent years, there has been a tendency among shipyards which are building steel ships to adopt a system similar to the assembly line production systems of other industries for the quantity production of a limited number of products, and, in this way, unitary blocks which constitute certain parts of a hull or hulls are constructed by various single-purpose machines with a high degree of overall efficiency. According to the system, blocks to be worked are placed on a conveyor and many different single-purpose machines are arranged alongside the line so that the blocks can be progressively worked and finished as they are conveyed forward.

The above system is gaining popularity because it is free from the uncertain factor of transfer of blocks as by cranes which is dictated by the environmental conditions of the shops. Moreover, it is beneficial in avoiding the great economic disadvantage of installing in scattered areas the very large and expensive single purpose equipment for handling such large structures as hull blocks.

However, the shipbuilding industry has the following problems. In the shipbuilding, the stages of work involved in the construction of unitary blocks that can be automatated or mechanized are only few and they are by nature relatively simple and yet require manual work between the stages. Another factor to be taken into consideration is that ships in most cases are built on individual orders to particular specifications and even ships of the same design can differ materially in the construction of the blocks and the work procedure to be employed. As a result, the overall amount of work that is executed by the individual single-purpose machines varies much with the blocks. Thus, the work on blocks once placed on a conveyor is governed by the specific block that demands the largest amount of work and it is difficult to convey all of the blocks at a constant speed with the same number of workers assigned along the line. Actually, therefore, the number of workers must be changed from time to time in an effort to synchronize the operations for the individual blocks. In addition, the workers posted to the stations between the automated or mechanized stages are often forced to stand by with no work to do or move to different positions.

SUMMARY OF THE INVENTION

The present invention has been perfected after a diversified study of the foregoing disadvantages of the layout of ordinary shipyards, and by an intensified effort to develop a line production system for a shipyard that can best meet the requirements for shipbuilding. The invention thus has for its object the creation of a shipyard which permits a remarkable saving of installation cost and extremely efficient shipbuilding through elimination of all operation (transfer) conveyors and which also is adapted to every possible conditions of location to be encountered and is capable of full utilization of a minimum of land space.

Briefly, the invention provides a shipyard in which a linear conveying section having conveying equipment for linear transfer, such as transfer trucks which travel on rails, cranes, or the like, is surrounded by individual shop sections for specialized processing stages having entrances through which the conveying equipment and/or the work to be handled is moved in and out, and the work units fabricated, manufactured or worked in the individual shop sections are transported by conveying equipment sequential shop sections, in such a manner that the operations from the starting stage to the last stage are carried out in succession in those specialized shop sections and the work units that have gone through the entire operations are carried by conveying equipment out of the specialized shop sections.

Many advantages including the following can be expected of a shipyard of the layout according to this invention:

1. The variation in the amount of work caused by the difference of the structure and size of work units being handled is always absorbed by the retension time under control in the individual specialized shop sections.
2. The number of specialized shop sections can be suitably chosen depending on changes in the size of the work units and in the amount of work required.
3. In constrast to ordinary shipyards which must be provided with extra space for each shop or area for specialized operation, the shipyard of this invention requires only a minimum number of extra areas which may be used in common with the specialized shop sections.
4. In conventional shipyards where the so-called stationary work system is adopted, a finished work unit must be transported over another work unit or units in process. This necessitates a conveying equipment such as a crane of sufficiently high lift, and demands high building cost where the operation is to be performed within a building. In a shipyard of the invention, by contrast, there is no necessity for carrying a work unit above any other unit and, therefore, the initial investment is low.
5. In general a work unit is constructed of members of different types, and the limitations of shipyard buildings and cranes for carrying the members in and out of the fabrication area render it difficult to accumulate and distribute the materials freely as desired. In the shipyard embodying the invention, only the flow of members from various source stages has to be considered, and the arrangement may be freely made so that conveyance of the members into specialized shop sections is carried out without mutual interference of the material supplies. Thus the flow of materials is simplified.
6. A work unit may be transferred to a subsequent station at any time desired provided that the shop where the subsequent operation is performed has room for it. Therefore, the work unit can be finished by various specialized equipment so as to meet the delivery requirement, in disregard of the amount of work involved.

Other objects, advantages and features will become apparent from the following detailed description taken in conjunction with the accompanying drawings.

DETAIL OF THE INVENTION

Figure 1:
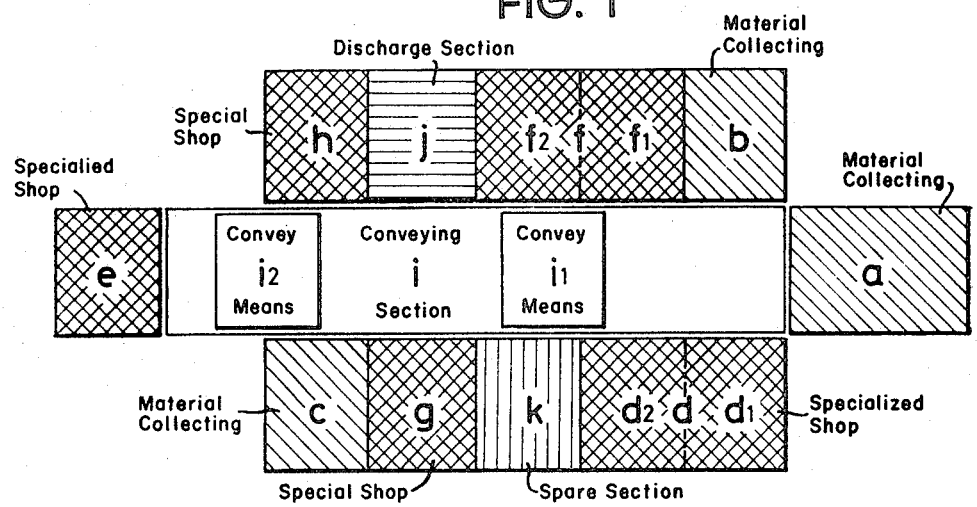
FIG. 1 is a basic layout plan of a shipyard according to the invention.

The embodiment of FIG. 1 represents a basic layout of a shipyard in accordance with the invention.

In the FIG., there is shown a strip of conveying section $i$ as having a pair of conveying means $i_1$ and $i_2$ for linear movement, e.g., transfer trucks or cranes. Along both sides and at one end of this section $i$, there is arranged material collecting sections $a$, $b$ and $c$, ecialized shop sections $d$, $e$, $f$, $g$ and $h$, a discharge section $j$ and a spare section $k$.

The material collecting sections $a$ to $c$ are provided for collection of members necessary for the completion of work units, classifying the members by types and properties. In the specialized shop sections $d$ to $h$, the respective process steps are carried out to work and finish the materials to final products. The discharge section $j$ is for discharging the finished work units, and the spare section $k$ is for temporarily storing a work unit or units from a process stage before being transferred to the subsequent stage as long as the subsequent stage is still occupied by a preceding work unit or units.

The material collecting sections $a$, $b$ and $c$, specialized shop sections $d$, $e$, $f$, $g$ and $h$, discharge section $j$ and spare section $k$ have entrances on the sides adjoining the conveying section $i$, and through those entrances the conveying means $i_1$ and $i_2$ and work units can be moved in and out of those sections, or work units can be moved in and out of the conveying means $i_1$ and $i_2$. Also as can be seen from FIG. 1, the specialized shop sections $d$ and $f$ may be further divided into pairs of specialized shop sections $d_1$, $d_2$ and $f_1$, $f_2$ depending on the sequence of the operation cycles to be performed in those shop sections. It is also possible to provide additional specialized shop sections where necessary.

Manufacture of a work unit or units is carried out in a shipyard of the foregoing layout in the following way. The members necessary to complete the particular work unit are taken out, according to the properties of the members, from the collecting sections $a$, $b$ and $c$, by means of the conveying means $i_1$ or $i_2$. The members are then carried into the specialized shop section $d$, particularly into the specialized shop section $d_1$ in the case of the layout shown in FIG. 1, where the members are fabricated and worked. Upon completion of the work in the specialized shop section $d_1$ the work unit is sent to the next specialized shop section $e$, where it is further worked. Thence it is carried by the conveying means $i_1$ or $i_2$ over to the specialized shop section $f_1$ or $f_2$ for the subsequent working.

In the similar way, on completion of the work in the specialized shop section $f_1$ or $f_2$, the work unit is further conveyed by the conveying means $i_1$ or $i_2$ in succession to the specialized shop sections $g$ and $h$ for further necessary operations. After the completion of the entire work for fabrication, machining, etc., the work unit is carried by the conveying means $i_1$ or $i_2$ to the discharge section $j$ and thence out of the shop section.

In the plant layout described above, the spare section $k$ is intended for temporary storage of a work unit or units which, after the completion of work in a certain specialized shop section, are to be conveyed to a next specialized shop section and must be held in the standby position because the preceding unit or units overstay in the next section. The spare section $k$ is used in common with all of the specialized shop sections.

In the shipyard according to the present invention, tables, rollers, conveyors, etc. are employed for the conveyance of members, work units, etc. between the shop sections $a$ to $h$, $j$ and $k$ and the conveying means $i_1$, $i_2$. The members, work units, etc. are either pulled or pushed for movement by drives installed on the conveying equipment, and there is no need of providing driving or conveying equipment for each shop section. When using a plurality of conveying means $i_1$, $i_2$, mutual interference of the equipment naturally takes place and, therefore, it is desirable to permit the delivery of work units or provide an exchange facility among the conveying means. The conveying means and the installations in the shop sections may be of any conventional types generally in use.

Figure 2:
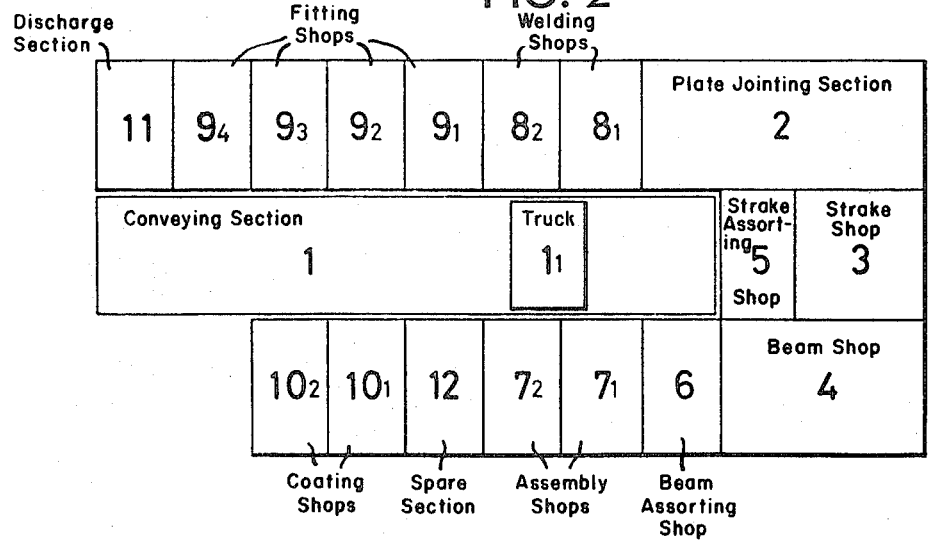
FIG. 2 is a layout plan of plants for the construction of flat blocks and for the surface treatment of steel products in a shipyard of a more unitary layout than in FIG. 1.

The embodiment shown in FIG. 2 will now be explained. In this embodiment the basic layout of a shipyard above described with reference to FIG. 1 is adopted for a flat block plant of a shipyard.

Generally speaking, flat blocks are constructed of flat plates which are fabricated in a plate-jointing shop, longitudinal strakes fabricated in a longitudinal strake shop, and transverse beams fabricated in a transverse beam shop.

Thus, the flat block plant according to this invention consists of a strip of conveying section 1 having a transfer truck $1_1$ which travels straightly on tracks not shown, surrounded by a generally U-shaped arrangement of shop sections necessary for the construction of flat blocks. Surrounding the conveying section 1 are: a plate-joining section 2, a longitudinal strake shop section 3 and a transverse beam shop 4 where materials are accumulated and worked; a longitudinal strake assorting shop section 5 where flat plates fabricated by the plate-jointing shop section 2 are assorted with longitudinal strakes made by the longitudinal strake shop section 3; a transverse beam assorting shop section 6 where transverse beams made by the transverse beam shop section 4 are assorted with the combinations of plates and transverse strakes; assembly shop sections $7_1$, $7_2$ where flat blocks are assembled to specified size and structure; welding shop sections $8_1$, $8_2$ where the members of the flat blocks assembled in the assembly shop sections $7_1$, $7_2$ are welded together; fitting shop sections $9_1$ to $9_4$ where the flat blocks welded in the welding shop sections $8_1$, $8_2$ are finished; coating shop sections $10_1$, $10_2$ where those of the flat blocks completed in the fitting shop sections which require coating are coated; a discharge section 11 through which completed flat blocks are conveyed out of the plant; and a spare section 12 where a flat block or blocks are working in any of the shop sections above mentioned are temporarily stored before being transferred to the next shop section as long as a preceding unit or units still remain in the next station. The shop sections disposed adjacent the conveying section 1 are provided with one entrance each, through which the transfer truck $1_1$ and a flat block or blocks can enter or leave the individual sections or through which a flat block or blocks can be transferred to or from the truck $1_1$.

In a flat block plant of the layout above described, flat blocks are constructed by the following procedure. First, materials necessary for the construction of blocks are piled and worked at the platejoining shop section 2, longitudinal strake shop section 3, and transverse beam shop section 4 to form jointed plates, longitudinal strakes and transverse beams. Next, the flat plates fabricated at the plate-jointing shop section 2 are carried by the truck $1_1$ in the conveying section 1 into the longitudinal strake assorting shop section 5, where longitudinal strakes are erected on the flat plates. Then, the flat plates assorted with the longitudinal strakes are conveyed by means of the truck $1_1$ to the transverse beam assorting shop section 6 and transverse beams are placed on the flat plates already assorted with the longitudinal strakes.

Thereafter, the flat plates combined with the longitudinal strakes and transverse beams are conveyed by the truck $1_1$ to the assembly shop sections $7_1$, $7_2$, where the flat plates, longitudinal strakes, and transverse beams in relative positions as specified are exactly positioned as by tack welding, and the temporary assemblies are carried by the truck $1_1$ to the welding shop sections $8_1$, $8_2$. In these sections the blocks are welded at as many points of the members as feasible by the use of automatic or semi-automatic welding machines. Next, the unfinished flat blocks fully welded in the welding shop sections $8_1$, $8_2$ are carried by the truck 1 to the fitting shop sections $9_1$ to $9_4$ so that the unfinished parts are finished as the blocks proceed through the four fitting shop sections. The finished blocks are then inspected.

The flat blocks that have passed the inspection are directly carried by the truck $1_1$ to the discharge section 11, from whence they are transferred onto trailers or other transportation vehicles for delivery out of the plant. These flat blocks that have passed the inspection and require coating are carried by the truck $1_1$ to the coating shop sections $10_1$, $10_2$, where they are subjected to sandblasting and coating, and then the coated blocks are carried by the truck $1_1$ to the discharge section 11 and thence to the outside.

The spare section 12 of this flat block plant serves to provide a space wherein a flat block or blocks under construction are temporarily placed when any preceding flat block or blocks are retained in between shop sections and hamper the smooth advance of the following block or blocks. It has no special or exclusive equipment of its own and may be used in common with all of the shop sections.

The flat block plant of the layout above described eliminates the disadvantages of ordinary layouts. In the construction of the flat blocks which constitue part of hull structure, it is noted that the bottom plating, transverse bulkheads, longitudnal bulkheads, and various decks have certain structural features or dissimilarities and involve different particulars and amounts of work during the process of construction. Therefore, when such blocks are carried on a line conveyor for quantity production, the conveying speed is limited to that of the block which requires a maximum of work and it makes retention of work of frequent transfer of labor inevitable. This problem is settled by this invention. Only if periods of retention time are given correspondingly to the amounts of work required on the flat blocks in the individual shop sections, the frequency of transfer of labor can be minimized and the variation of process which is unforeseeable can be isolatedly absorbed without practically affecting other blocks, for the great convenience from the viewpoint of process control.

In the flat block plant according to the invention, the shop sections of the same series as classified by the type of operations, e.g., the assembly shop sections $7_1$, $7_2$, welding shop sections $8_1$, or coating shop sections $10_1$, $10_2$ can be collectively located in sufficiently adjacent and limited sites for high degree of mechanization or efficient joint use of equipment. This renders it possible to expect sharp reductions in the number of man-hours and initial investment on equipment.

Further, in the flat block plant of the invention, finished blocks can be delivered out irrespective of the order of work starting and, therefore, the blocks can be promptly completed in succession even when the start of work is delayed or the process is retarded by some difficulty in securing the materials or by other reasons, without giving any adverse effect upon the construction of other flat blocks.

While the present invention has been described in conjunction with specific embodiments thereof, the invention is in no way limited thereto but numerous modifications are possible without departing from the spirit and scope and of the invention. In brief, this invention provides a shipyard for constructing a work structure which is completed by a combination of a plurality of process steps, comprising a strip of conveying section which is equipped with a conveying equipment adapted to move straightly forward and backward, and specialized shop sections for performing the individual process steps having entrances on the sides facing said strip of conveying section through which said conveying equipment and/or work unit can enter or leave the individual shop sections, said specialized shop sections being located as if to surround said conveying section. With the construction described, the individual work units can be freely transferred by the conveying equipment, so that specialized operations are performed in a smooth flow system. The operations proceed efficiently, process control is accomplished with ease, and the construction cost of buildings and other establishments can be largely saved. These features of the shipyard according to this invention are remarkably contributory to the improvement of efficiency in the shipbuilding industry.

What is claimed is:

1. An assembly-line type of shipyard comprising:
 a. an elongated horizontal conveyor travel path upon which work piece components of a ship's hull may be carried;
 b. conveying means movable on said travel path in a direction longitudinally of and transverse to said path for moving work piece components between and into discrete work stations;
 c. a material collecting shop station at one end of said path;
 d. a discharge shop station adjacent the other end of said path;
 e. a plurality of discrete separate work shop stations situated on both sides of said path intermediate its ends within which sequential work on a ship's hull may be performed, each shop station having an entrance facing said path and of such size as to accommodate said conveying means with work pieces situated thereon;
 f. means in at least one work shop station for joining together at least two work pieces;
 g. means in another work shop station for applying a protective coating to the work pieces previously joined; and
 h. a spare shop station for temporarily storing joined work pieces in the event that a subsequent work shop station is occupied by work piece components.

* * * * *